United States Patent [19]

Carbrey

[11] E Re. 31,510

[45] Reissued Jan. 24, 1984

[54] SIGNAL MULTIPLEXING CIRCUIT

[75] Inventor: Robert L. Carbrey, Boulder, Colo.

[73] Assignee: Bell Telephone Laboratories, Incorporated, Murray Hill, N.J.

[21] Appl. No.: 328,745

[22] Filed: Dec. 8, 1981

Related U.S. Patent Documents

Reissue of:

[64] Patent No.: 4,178,480
Issued: Dec. 11, 1979
Appl. No.: 926,422
Filed: Jul. 20, 1978

[51] Int. Cl.[3] ..... H04J 3/00

[52] U.S. Cl. ..... 370/50; 179/2 DP

[58] Field of Search ..... 370/1, 11, 24, 50, 119; 179/2 DP, 3, 18 AD, 99 M, 99 LS

[56] References Cited

U.S. PATENT DOCUMENTS

| | | | |
|---|---|---|---|
| 3,165,590 | 1/1965 | Brook et al. | 179/84 R |
| 3,399,278 | 8/1968 | Dahlman | 370/50 |
| 3,553,386 | 1/1971 | Golembeski | 179/84 T |
| 3,701,854 | 10/1972 | Anderson et al. | 179/18 AD |
| 3,718,767 | 2/1973 | Ellis | 370/50 |

*Primary Examiner*—Joseph A. Popek
*Attorney, Agent, or Firm*—J. M. Graziano

[57] ABSTRACT

The disclosed signal multiplexing circuit (110) makes use of a single pair of wires (T, R) to interface a data and voice communication circuit such as an electronic key telephone (EKT) station set (100) with a central data and voice communication system such as a communication system (BCS). The signal multiplexing circuit transmits outgoing standard voice signals, outgoing auxiliary signals and outgoing data and, in turn, simultaneously receives incoming standard voice signals, incoming data and incoming auxiliary signals on the single pair of wires. Both time division and frequency separation techniques are concurrently employed to achieve multiple use of the single pair of wires without crosstalk between the plurality of signals. The data signals are transmitted as bipolar bit pairs preceded by a data start pulse pair. The outgoing data bipolar bit pairs are delayed until the center transition of the incoming data bipolar pulse pair is detected. The first half of the incoming data bipolar pulse pair appears on the line undisturbed while the second half of the same pulse pair is "overwritten" by the first half of the outgoing data bipolar pulse pair.

28 Claims, 7 Drawing Figures

SIGNAL MULTIPLEXING CIRCUIT

Matter enclosed in heavy brackets [ ] appears in the original patent but forms no part of this reissue specification; matter printed in italics indicates the additions made by reissue.

CROSS REFERENCE TO RELATED APPLICATIONS

This application is related to [application Ser. No. 926,421] *U.S. Pat. No. 4,171,467* of L. N. Evenchik entitled "Signal Multiplexing Circuit", filed on the same date hereof, *issued October 16, 1979,* which [application] *patent* teaches a "time hybrid" version of the disclosed signal multiplexing circuit.

FIELD OF THE INVENTION

This invention relates to combined data and voice communication systems and in particular to a signal multiplexing circuit which transmits and receives voice signals, data, auxiliary signals between a central communication system and a remote communication circuit via a single pair of wires.

DESCRIPTION OF THE PRIOR ART

There have been a number of prior art patents concerning the use of a single pair of wires to carry more than one type of signal. U.S. Pat. No. 3,165,590 issued Jan. 12, 1965 to C. E. Brooks et al teaches utilizing a single pair of wires to transmit both ringing signals and voice paging signals in a single direction to a telephone station set. The voice paging signals are simply transmitted over the pair of wires during the silent interval of ringing, thereby providing a simple form of voice paging. U.S. Pat. No. 3,553,386 issued Jan. 5, 1971 to J. J. Golembeski teaches a paging arrangement wherein an FM signal is used to provide voice paging to a telephone station set while a dual frequency tone ringing signal is also sent to the telephone station set. This is essentially a frequency separation scheme which enables the telephone station set to distinguish between the two signals. Additionally, there are mumerous prior art patents teaching various time division techniques to multiplex a number of signals together into a single composite unidirectional signal.

Thus, there are numerous prior art signaling arrangements wherein two separate signals are transmitted in the same direction on a single pair of wires. The methods employed to accomplish this are either time division switching, frequency separation of signals, or simply utilizing signals that don't overlap in time. These signal multiplexing techniques generally require extensive circuitry to implement and great care must be taken to avoid crosstalk between the various signals. Additionally, these prior art signal multiplexing arrangements are generally unidirectional communication schemes and no provisions are made for bidirectional communication on the single pair of wires.

These limitations are especially pertinent in the case of electronic key telephone station sets. In addition to standard voice signals, electronic key telephone (EKT) station sets receive an input data stream from the business communication system (BCS) to control the ringer and to define which lamps on the station set are to be lighted. The electronic key telephone station set in turn generates an output data stream which is transmitted to the business communication system to define the status of the switchhook, key buttons, and TOUCH-TONE buttons. These prior art electronic key telephone station sets require the use of six wires, one pair for standard voice signals, one pair for data from the business communication system to the electronic key telephone station set, and one pair for data from the electronic key telephone station set to the business communication system.

However, in viewing the details of the EKT set operation, it becomes apparent that the six wires between the EKT station set and the BCS are not utilized to their full capacity. For example, the input and output data signals comprise short bursts of data followed by long intervals (from a data transmission standpoint) of silence. It would therefore be advantageous to eliminate the two pairs of wires used for data communication and instead transmit all signals on a single pair of wires. However, this would entail concurrently transmitting six separate and distinct signals, three in each direction, on the single pair of wires between the EKT station set and the BCS.

SUMMARY OF THE INVENTION

In accordance with my invention, I provide a signal multiplexing circuit that employs only a single pair of wires to concurrently transmit a plurality of signals for bidirectional communication without crosstalk between the various signals. This is advantageous in many situations and for example, would enable the residential telephone lines to be used for data communication without interfering with the normal bidirectional voice communication. Thus, conceptually, a residential customer could be provided with a terminal for accessing a centrally located data communication system, such as a computer, via the residence telephone line while also permitting the residence telephone line to be used in standard fashion for voice communication.

There are a multitude of alternative uses for such a signal multiplexing circuit and the preferred embodiment disclosed herein illustrates an application wherein an electronic key telephone station set is connected to a business communication system via a single pair of wires. The single pair of wires carries the standard bidirectional voice signal, the electronic key telephone station set input and output data streams, as well as a bidirectional auxiliary signal to and from the BCS, which signal may be anything from data to hands-free answer voice signals. This is accomplished by concurrently separating the six distinct signals from each other in both frequency and time. The standard bidirectional voice signals are directly transmitted on the communication pair and comprise audio signals in the voice frequency band. The input and output data streams comprise periodic bursts of bipolar pulses of Pulse Amplitude Modulation (PAM) preceded by a positive pulse to identify the data transmission as EKT stations et control information. The auxiliary signals comprise bipolar pulses of Pulse Width Modulation (PWM) transmitted on the communication pair during the silent interval between successive input and output data stream PAM data bursts and in the disclosed embodiment comprise hands-free answer voice signals.

Separation of the input and output data signals and the bidirectional auxiliary signals from the standard voice signals is advantageously accomplished by formatting the data signals so that they have little energy within the audio band. The data signals are transmitted as bipolar bit pairs preceded by a data start pulse pair. Therefore, each bit pair has a net energy of zero when averaged over the full cycle. By using a pair duration which is short compared to the audio frequencies and data bursts which are short compared to the time between bursts, the data signal spectrum will be concentrated principally in a band around the frequency corresponding to the pair duration, its harmonics, and the frequency corresponding to half the pair frequency. Minimal filtering is therefore required to suppress the products falling in the normal audio band.

The input and output data streams and the bidirectional auxiliary signals are separated from each other in time so that they are mutually exclusive, with only one set of these signals appearing on the communication pair at a time. Thus, the appearance of a positive lead pulse is all that is needed to identify the input and output data streams and distinguish them from the auxiliary signals.

The incoming data bipolar pulse pairs are also separated from the outgoing data bipolar pulse pairs in time. In particular, the transmission of an outgoing data bipolar pulse pair is delayed until the center transition of the incoming data bipolar pulse pair is detected. Thus, the first half of the incoming data bipolar pulse pair appears on the line undisturbed while the second half of the same pulse pair is "overwritten" by the first half of the outgoing data bipolar pulse pair. Thus, the two signals are separated from each other in time by one-half the pulse pair duration and the two signals overlap for that half pulse pair duration. The incoming and outgoing auxiliary bipolar pulse pair signals are handled in similar fashion with an overlap of one half the pulse pair duration.

Therefore, the signal multiplexing circuit of the present invention provides six separate signals on a single pair of wires with little modification of the existing electronic key telephone station set signaling format. The standard bidirectional voice signals are separated from the high frequency input and output data streams and bidirectional auxiliary signals by a low pass filter and the input and output data streams are differentiated from the auxiliary signals by the presence of a leading positive pulse.

BRIEF DESCRIPTION OF THE DRAWING

The operation and utilization of the present invention will be more fully apparent from the following description of the drawing in which.

GENERAL DESCRIPTION—FIG. 1

Figure 1:
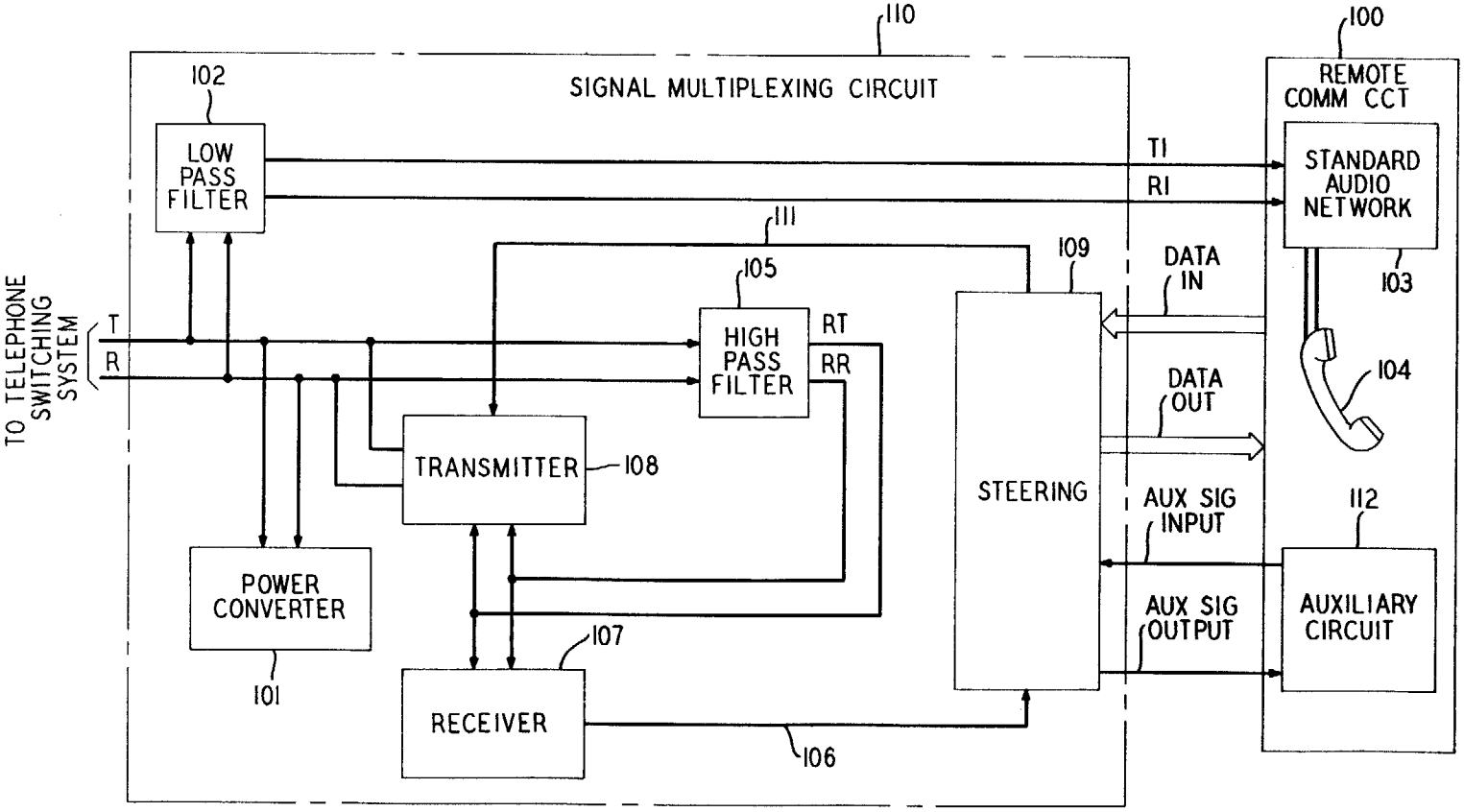
FIG. 1 illustrates one embodiment of my invention in block diagram form.

FIG. 1 shows the signal multiplexing circuit in block diagram form wherein signal multiplexing circuit 110 is associated with a remote communication circuit 100, which, in this particular disclosed application, is assumed to be a telephone station set 100, connected to a business communication system (not shown) by the communication pair, leads T and R. Telephone station set 100 is, for the purpose of this disclosure, assumed to be an electronic key telephone (EKT) station set although the signal multiplexing circuit of my invention may be employed with any data and voice communication circuit that processes similar signals such as a data and voice communication system for interfacing a residence telephone line with a computer.

Electronic key telephone station sets are well known in the art and U.S. Pat. No. 3,701,854 issued Oct. 31, 1972 to Anderson et al illustrates a typical prior art EKT station set. For the purpose of this disclosure, it will be assumed that EKT station set 100 receives and transmits standard bidirectional voice signals in addition to a data stream comprised of bursts of bipolar pulse pairs. Additionally, it will be assumed that bidirectional auxiliary signals are also processed by signal multiplexing circuit 110. As discussed above, these auxiliary signals can be either data or voice signals and, for the purpose of this disclosure, it will be assumed that these signals comprise hands-free answer voice signals. These hands-free answer voice signals generally would comprise a paging signal from the BCS attendant to the subscriber at EKT station set 100, with the subscriber having the capability of responding to the paging signal hands-free. The equipment necessary to provide this capability is well-known in the art and generally would comprise a voice switch, loudspeaker, and a microphone. This circuitry is shown as auxiliary circuit 112, which circuit may be located in EKT station set 100 as is shown on FIG. 1.

It is obvious from this description that the central data and voice communication system connected to the other end of the communication pair must also employ analogous signal multiplexing circuitry to transmit and receive the above-mentioned signals on the communication pair in the format described. While it is beyond the scope of this description to pursue, in detail, the exact structure employed therein, suffice it to say that most of signal multiplexing circuit 110 can be directly applied to that application. Of course, clock circuits would be needed to provide the timing signals that signal multiplexing circuit 110 derives from the received signal, but this and any other adaptations necessary are straightforward modifications to the disclosed signal multiplexing circuit.

Thus, signal multiplexing circuit 110 eliminates the necessity of employing six wires to connect EKT station set 100 to the business or other data communication system. Instead, signal multiplexing circuit 110 employs only a single pair of wires which are used to transmit and receive standard voice signals, data, as well as an auxiliary signal. This is accomplished by concurrently employing both time division and frequency separation techniques to transmit all the above-mentioned signals on the single pair of wires.

The standard bidirectional voice signals are directly transmitted on the communication pair and comprise audio signals in the voice frequency band. The input and output data streams comprise periodic bursts of 100 kHz bipolar pulse pairs of Pulse Amplitude Modulation (PAM) preceded by a positive pulse pair to identify the data transmission. The auxiliary signal comprises 100 kHz bipolar pulse pairs, with a leading negative pulse, of Pulse Width Modulation (PWM) transmitted between the input and output data stream PAM data bursts.

Signal multiplexing circuit 110 contains a power converter 101 which obtains power from the communication pair (leads T and R) by converting the battery voltage appearing thereon to the bias voltage levels required by the various circuits that comprise signal multiplexing circuit 110. Low pass filter 102 is connected to the communication pair and serves to pass only the low frequency standard audio signals appearing thereon to standard audio network 103 and handset 104 of EKT station set 100. The data and auxiliary signals are passed by high pass filter 105 to receiver circuit 107. The received data and auxiliary signals are then forwarded to steering circuit 109 wherein the auxiliary signal is separated from the data. The auxiliary signal is processed by a pulse width demodulator located in steering circuit 109, which converts the received auxiliary signal to the output format required. The data signals are in turn processed by timing and storage circuitry which interfaces the data signals to the existing EKT station set data circuitry.

EKT station set 100 meanwhile provides output auxiliary signals and data to steering circuit 109 which interleaves the outgoing auxiliary signals and the outgoing data with the incoming auxiliary signals and incoming data and supplies the outgoing data and auxiliary signals to transmitter 108 for transmission to the business communication system via the communication pair.

Thus, signal multiplexing circuit 110 functions to separate the standard audio signals, incoming auxiliary signals, and incoming data from each other and apply these three separate signals to the appropriate EKT station set circuitry. Additionally, the outgoing standard audio signals, outgoing auxiliary signals, and outgoing data generated by the EKT station set are coded and interleaved with the incoming signals and applied to the communication pair by signal multiplexing circuit 110. Therefore, signal multiplexing circuit 110 functions to interface EKT station set 100 with the BCS system via a single pair of conductors.

DETAILED DESCRIPTION—FIGS. 3 through 6

Figure 2:
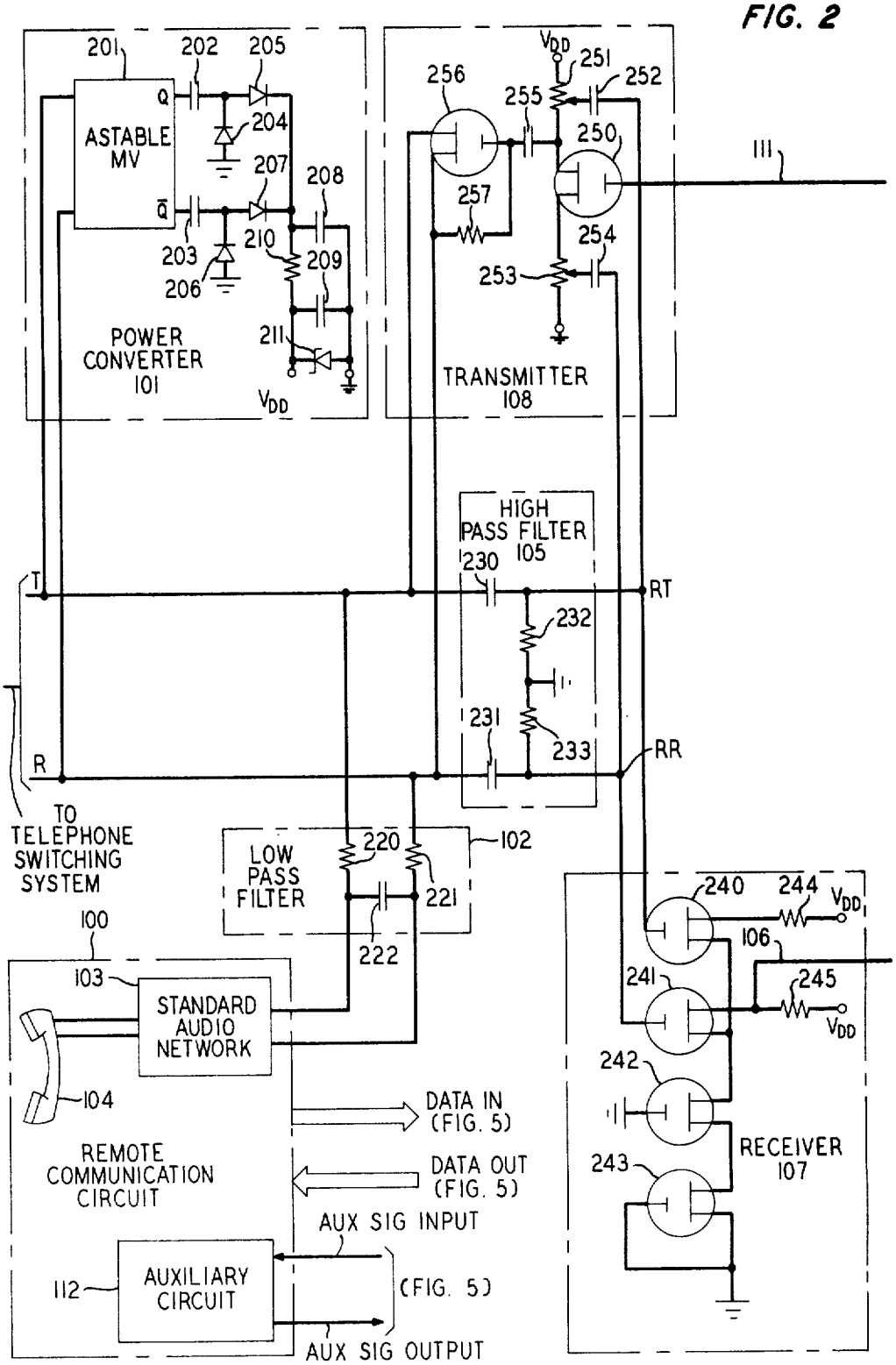
FIGS. 2–5 show the details of the circuit illustrated in FIG. 1.

The signal multiplexing circuit, as broadly described above and as shown in block diagram form in FIG. 1, is disclosed in further detail in FIGS. 3 through 6, which figure should be arranged as shown in FIG. 2.

Power converter 101 in FIG. 2 is connected to the communication pair which have impressed thereon the standard dc bias voltage associated with a telephone loop, which, for the purpose of this description, is assumed to be—48 volts on lead R and circuit ground on lead T. A stable multivibrator 201 in power converter 101 is connected to the communication pair and is powered by the aforementioned dc bias voltage appearing thereon. This dc bias voltage causes astable multivibrator 201 to oscillate thereby producing a square wave voltage signal at output terminal Q and another square wave voltage signal 180 degrees out-of-phase with respect to the first signal at terminal Q. These square wave voltage signals are passed through capacitors 202 and 203 to half wave diode rectifiers 204–205 and 206–207 respectively and thence through a pi filter comprised of resistor 210 and capacitors 208 and 209. The filter output is then supplied to zener diode 211 which functions to establish the potential difference between the two output voltages which are labeled as VDD and VSS volts respectively, which voltages are supplied to the remaining circuitry of signal multiplexing circuit 110.

As previously discussed, one of the signals appearing on the communication pair is the standard low frequency bidirectional audio signal. This signal is separated from the other signals by low pass filter 102 which is comprised of resistors 220, 221 and capacitor 222. This standard low pass filter blocks the high frequency data and auxiliary signals appearing on the communication pair from reaching standard audio network 103 and only passes the standard low frequency bidirectional audio signals. Because the data and auxiliary signals are formatted so as to have very little audio frequency component, the amount of filtering required is small. Standard audio network 103 is the standard telephone network appearing in the EKT station set and typically serves to interface handset 104 with the communication pair although in this case low pass filter 102 is interposed between standard audio network 103 and the communication pair as described above.

INCOMING SIGNAL WAVEFORMS—FIG. 7.

Figure 7:
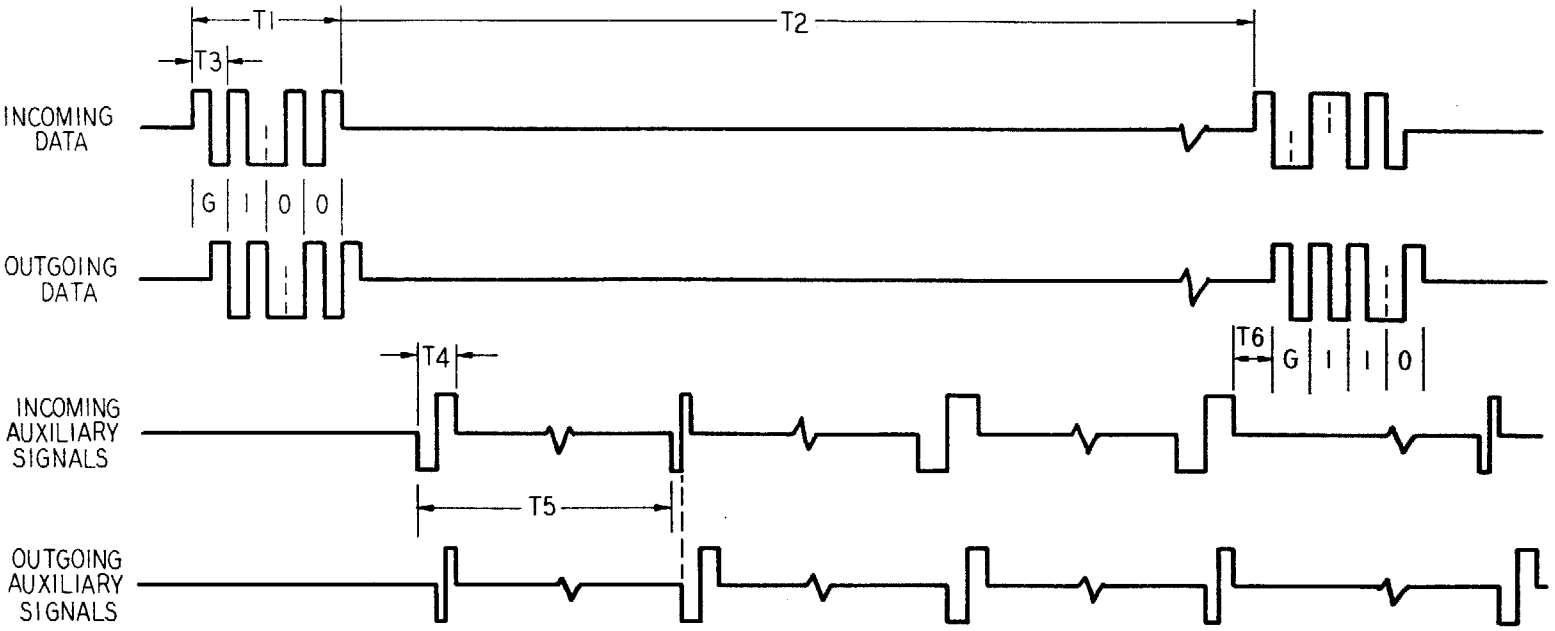
FIG. 7 shows typical voltage waveforms of the data an auxiliary signals.

At this juncture it is appropriate to discuss the voltage waveforms of the signals appearing on the communication pair. FIG. 7 illustrates the voltage waveforms and the following description clarifies the relationship between the various signals. The first voltage waveform labelled as "incoming data" shows a typical incoming data message in idealized form. The actual voltage waveforms would not be perfectly square as shown but would actually appear somewhat sinusoidal due to the characteristic impedance of the communication pair. For the purpose of this description, however, all voltage waveforms will be considered as square wave signals. The incoming data message is, for the purpose of illustration, assumed to be a three bit message preceded by a guard bit. The guard bit is a pulse pair comprised of a leading positive pulse immediately followed by an equal and opposite negative pulse, thus distinguishing the data signals from the auxiliary signals which always consist of a pulse pair having a leading negative pulse followed by an equal and opposite positive pulse. Thus, when a positive lead pulse is detected, the signal appearing during the time period indicated as T1 on FIG. 7 will comprise the data message, which in this case is three bits long with each bit having a duration labelled as T3. These data messages appear periodically on the communication pair with the time period between the end of one message and the beginning of the next indicated by time period T2 on FIG. 7. Thus, during time period T2, no data message appears and this is when the auxiliary signals are transmitted on the communication pair.

The other incoming signal is the incoming auxiliary signal and the voltage waveform shown illustrates the typical PWM auxiliary signal appearing on the communication pair. The PWM signals are all single pulse pairs with a leading negative pulse followed by an equal and opposite positive pulse with the data content being the width of the PWM pulse. This is illustrated in slightly exaggerated form by showing narrow and wide pulses on FIG. 7. These PWM pulse pairs appear periodically on the communication pair during time period T2 with the time period between adjacent pulses being given by time period T5 and the time between the last PWM pulse and the beginning of a data message being given by the guard interval time period T6.

OUTGOING SIGNAL WAVEFORMS—FIG. 7

The outgoing signal waveforms are also shown on FIG. 7, with the first of these being labeled as "outgoing data". The outgoing data burst comprises the data transmission from EKT station set 100 to the BCS and is configured identical to the incoming data burst—three bits of data preceded by a guard bit pulse pair. Signal multiplexing circuit 110 generates the outgoing guard bit pulse pair as soon as the center pair transition of the incoming guard bit pulse pair is detected. Thus, each outgoing data pulse pair is transmitted once the center pair transition of the corresponding incoming data pulse pair is detected. The outgoing auxiliary signal pulse pairs are transmitted in similar fashion with each outgoing auxiliary signal pulse pair being transmitted once the center pair transition of the corresponding incoming auxiliary signal pulse pair is detected.

HIGH PASS FILTER 105—FIG. 2

The received data and auxiliary signal are passed from the communication pair to leads RT and RR respectively by high pass filter 105. High pass filter 105 is comprised of capacitors 230, 231 resistors 232, 233 and functions to block the dc bias and the low frequency standard bidirectional audio signals appearing on the communication pair from reaching receiver circuit 107. The received data and auxiliary signals passed by high pass filter 105 to leads RT and RR are detected by a differential amplifier which is comprised of transistors 240, 241 resistors 244, 245 of receiver circuit 107, which amplifier converts the balanced signals appearing on the communication pair to a composite unbalanced signal appearing on conductor 106. Transistors 242 and 243 comprise a high impedance load for this differential amplifier which amplifier functions to pass only transverse signals appearing on leads RT and RR while rejecting any longitudinal signals appearing thereon. Thus, the differential amplifier rejects any longitudinal noise signals appearing on the communication pair that happen to be passed through high pass filter 105.

STEERING CIRCUIT 109

Figure 3:
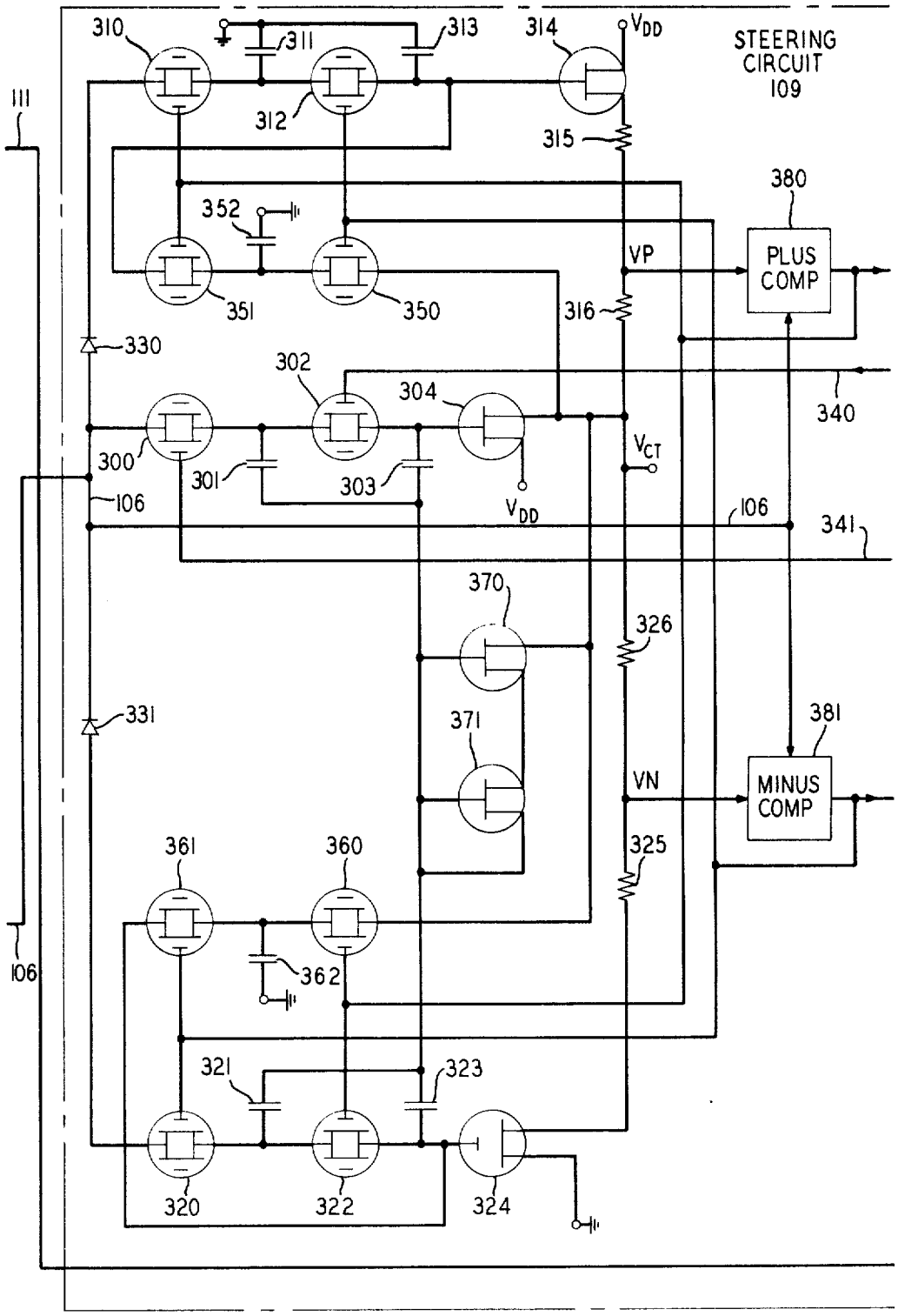
Figure 4:
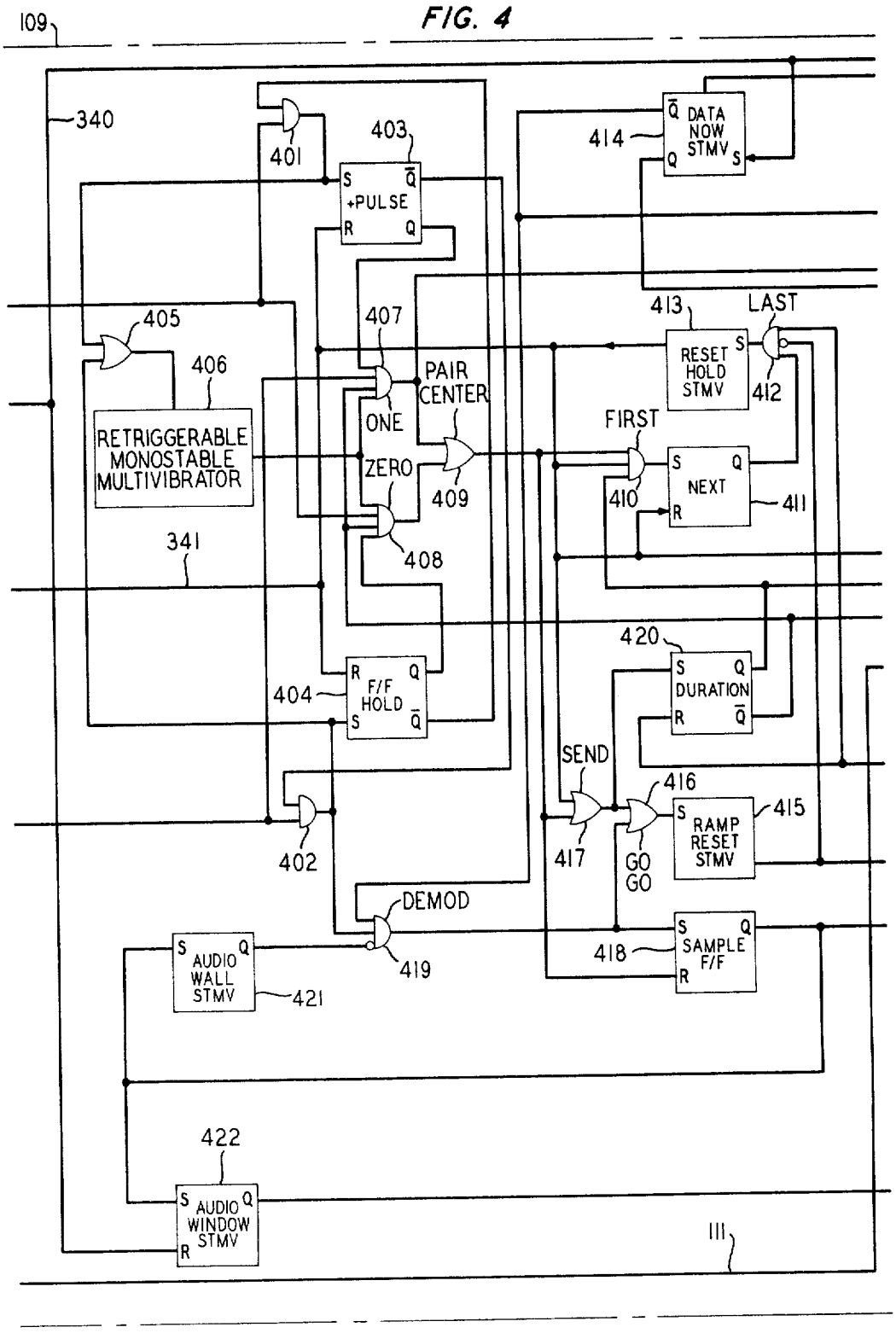
Figure 5:
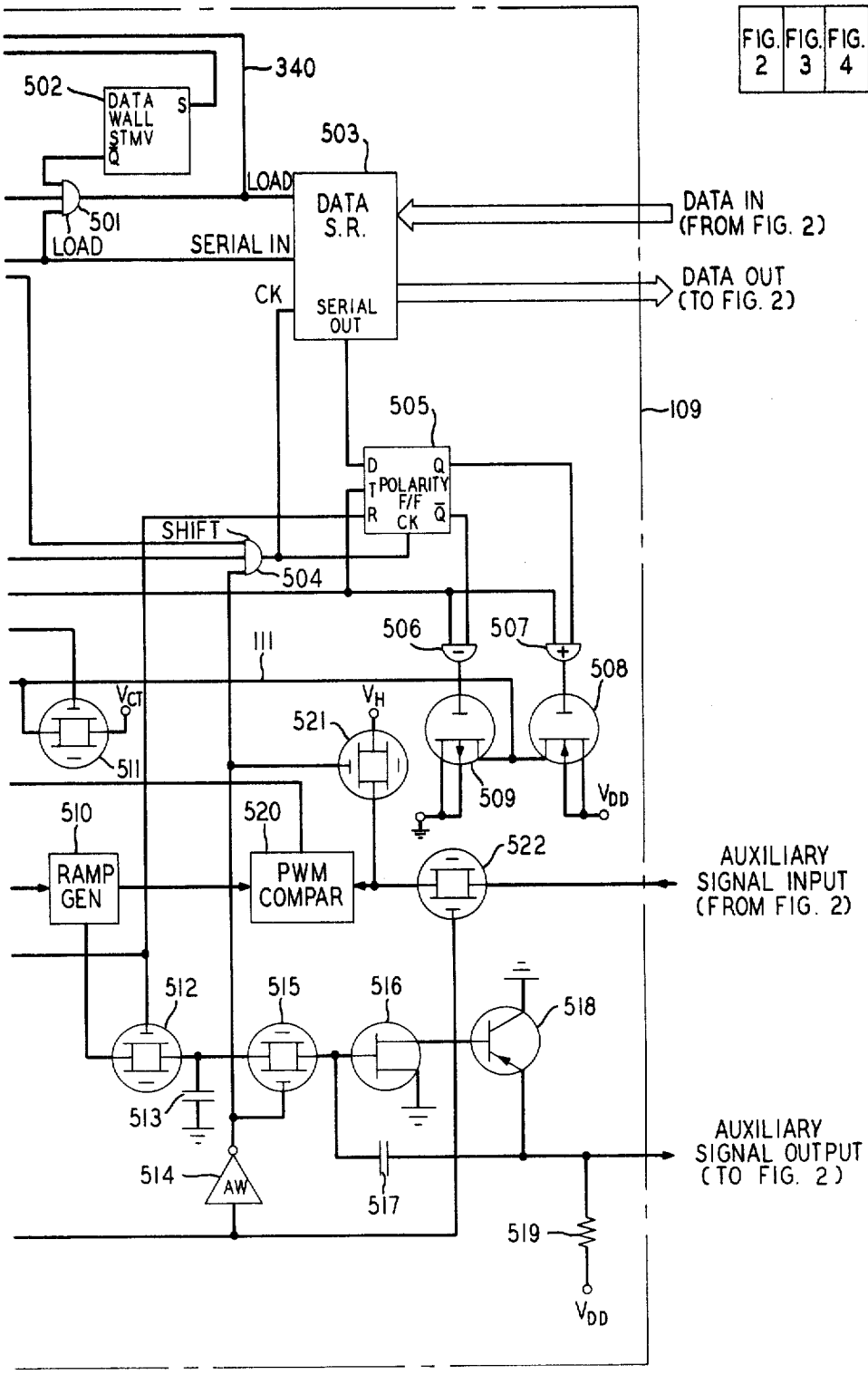
Figure 6:
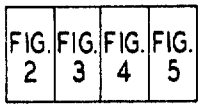
FIG. 6 shows the manner in which FIGS. 2–5 should be arranged.

The data and auxiliary signals received by receiver 107 are output on lead 106 to steering circuit 109 which is shown in detail on FIGS. 3, 4 and 5. These bipolar pulse pair signals appearing on lead 106 are passed through switch 300 to capacitor 301. Switch 300 is simply an N-type and a P-type field effect transistor connected in parallel with complementary control signals applied to the gate electrodes thereby forming a bidirectional semiconductor switch. The RCA type CD 4016B device is a switch of this type. The symbol shown on FIG. 3 for switch 300 will be used throughout the remaining figures and for simplicity sake will simply be referred to as a switch, which is the function that it performs. Returning to the description, the bipolar pulse pair signals appearing on lead 106 are passed to capacitor 301 through closed switch 300. Switch 300 is then opened and switch 302 is closed, thereby passing the signal stored on capacitor 301 to capacitor 303. Capacitor 303 is much larger in size than capacitor 301 and, therefore, switches 300 and 302 and capacitors 301 and 303 act in combination as a low pass filter, since it takes a long time to charge up capacitor 303 to the voltage level stored on capacitor 301 due to the gross inequalities in size between the two capacitors. This low pass filter arrangement acts to establish the dc bias level seen on lead 106 by filtering the input bipolar pulse pair signals, thereby determining the steady state dc bias level appearing thereon. Similar low pass filter arrangements are provided with the positive pulses of the bipolar pulse pairs appearing on conductor 106 being passed by diode 330 to a low pass filter comprised of switches 310, 312 and capacitors 311, 313 and with the negative pulses of the bipolar pulse pairs appearing on conductor 106 being passed by diode 331 to the low pass filter comprised of switches 320, 322 and capacitors 321 and 323. These two low pass filter-diode combinations establish the average positive pulse power level and the average negative pulse power level respectively. These three levels established by the above-mentioned circuitry function in conjunction with the voltage divider comprised of transistors 304, 314, 324 and resistors 315, 316, 325 and 326 to establish three separate output signals comprised of average positive peak voltage (VP), average dc bias level (VCT) and the average negative peak dc level (VN). Clock signals hereinbelow described appear on control leads 340 and 341 to activate the switches of these low pass filter combinations in the appropriate timing sequence.

Additional circuitry is provided to supply a "leak" to discharge capacitors 313 and 323 should they happen to accumulate too large a voltage. This is accomplished by connecting voltage VCT to capacitors 313 and 323 through switches 350, 351, capacitor 352 as well as switches 360, 361 capacitor 362 respectively. Capacitors 352 and 362 are much smaller than capacitors 313 and 323 so that the charge transfer between the two sets of capacitors will be small and it will, therefore, take a significant amount of time to fully discharge capacitors 313 and 323 to voltage VCT if the data pulse trains are removed.

The positive and negative average peak voltages as determined by the above-described voltage divider are applied to the plus comparator 380 and the minus comparator 381 respectively. The other inputs of these two comparators are connected to conductor 106 and carry the received pulse signal appearing on the communication pair. Thus, the incoming signal is compared with the average dc voltage level of the positive and negative pulses and the determination is made as to whether the incoming signal comprises a valid positive pulse or a valid negative pulse.

DATA BURST DETECTION

As described above, a data burst is always preceded by a guard bit pulse pair to distinguish it from the auxiliary signals. When the positive first half of this guard bit pulse pair exceeds the plus comparator reference bias VP, plus comparator 380 activates gate 401, setting flip-flop 403 and holding gate 402 off thereby preventing flip-flop 404 from being set. Gate 401 on also activates gate 405 which triggers retriggerable monostable multivibrator 406. The output of this multivibrator provides an enable signal to both gates 407 and 408. However, only one of these gates will be enabled and, in the instant case, gate 407 will have high inputs from flip-flops 403, 420 and multivibrator 406. Thus, when the negative half of the incoming pulse pair appears on lead 106, triggering minus comparator 381, the high output of comparator 381 triggers gate 407 indicating that a valid pulse pair was received. If a negative half of the incoming pulse was not received within the design interval defined by multivibrator 406, then multivibrator 406 would time out and gates 407 and 408 would be disabled. However, assuming that a valid pulse pair was received, the negative half of the incoming pulse pair triggers gate 407 which in turn triggers gate 501 in FIG. 5 and places a high input on the Serial In and Load inputs of data shift register 503. This causes data shift register 503 to be loaded with data from the EKT station set shift register. This loaded data can then be shifted out and returned to the BCS as new data is shifted in to data shift register 503. The high output of gate 501 also sets single-trip multivibrator 414, thereby disabling gate 501 for the duration of the multivibrator time period, which in the present disclosure is established as time period T1. Single-trip multivibrator 414 disables gate 501 thereby preventing any subsequent positive pulses from reloading data shift register 503 during the data burst. Multivibrator 414 is reset at the end of time period T1 and in turning off sets single-trip multivibrator 502 which also disables gate 501 for the time period T2 so that no incoming noise signals will activate the shift register before a valid data burst is expected.

The clock function is provided by the detection of the pulse pair center transition and is accomplished by gate 409. As previously mentioned, gate 407 is turned on by the incoming pulse pair and gate 407 in turn activates gate 409 which turns on gate 417 setting flip-flop 420, turning on gate 416 thereby activating single-trip multivibrator 415. Time period of multivibrator 415 is short and this short output pulse causes the discharge of the capacitor in ramp generator 510. At the end of this short output the capacitor in ramp generator 510 begins to recharge thereby placing an ever increasing ramp voltage on one input of PWM comparator 520. The other input of PWM comparator 520 is connected through switch 521 to a fixed dc threshold voltage VH. Comparator 520 generates an output pulse as soon as the input ramp voltage reaches dc threshold voltage VH, with this pulse resetting flip-flop 420 thereby terminating the first half of the clock cycle.

The aforementioned high signal from gate 409 activates gate 410 setting flip-flop 411 which, in turn, enables gate 412. The output pulse from PWM comparator 520 now activates enabled gate 412 setting single-trip multivibrator 413 which generates an output pulse to reset the aforementioned pulse pair detection circuitry comprised of flip-flops 403, 404 and 411. Additionally, this pulse passes through gates 417 and 416 to set flip-flop 420 and trigger single-trip multivibrator 415, thereby discharging the capacitor in ramp generator 510. During the second half of the pulse period when ramp generator 510 reaches dc threshold voltage VH, gate 412 is disabled and another sequence can not be initated until another clock pulse is generated by gate 409.

DATA OUTPUT

Meanwhile, data signals are being shifted out of data shift register 503 and transmitted back to the BCS. This is accomplished by single trip multivibrator 413 output pulse activating gate 504 of FIG. 5 which signal clocks shift register 503 thereby storing the data signal appearing on the Serial In lead while concurrently shifting out the data signal appearing on the Serial Out terminal. The output signal of shift register 503 is placed on the D input of flip-flop 505 and, since the guard bit of a data burst always has a leading positive pulse, flip-flop 505 will be set enabling gate 507 and transistor 508 thereby pulling lead 111 high. After the aforementioned reset sequence wherein flip-flop 420 was reset, flip-flop 505 is toggled and gate 507 is turned off while gate 506 and transistor 509 are turned on pulling lead 111 low, thereby completing the pulse pair.

TRANSMITTER 108

The pulse pair appearing on lead 111 activates transistor 250 to generate the output pulse for transmission to the BCS via the communication pair. Activated transistor 250 activates the line driver comprised of capacitor 255, transistor 256, resistor 257 which serves to transmit the pulse pairs to the communication pair. However, resistor 251-capacitor 252 combination and resistor 253-capacitor 254 combination in conjunction with transistor 250 comprises a 180 degree phase shift amplifier to prevent the transmit pulse pair signals from being detected by receiver 107. This is accomplished by coupling a 180 degree out-of-phase version of the outgoing pulse pair to leads RT and RR while the outgoing pulse pair signals are coupled on the other side of high pass filter 105 to the communication pair, thereby cancelling the signals as seen by receiver 107.

INCOMING AUXILIARY SIGNALS

Auxiliary signal pulse pairs comprising PWM pulses with a leading negative pulse are detected by minus comparator 381 of FIG. 3, which comparator operates thereby setting flip-flop 404 through gate 402. The high output of gate 402 activates gate 419 setting flip-flop 418 and activating gate 416. Single trip multivibrator 415 is set by activated gate 416 while single-trip multivibrators 421 and 422 are set by flip-flop 418. Flip-flop 420 is not set, therefore, switch 511 is on holding lead 111 at the steady state dc voltage VCT thereby preventing transmitter 108 from operating. The time period of multivibrator 421 is slightly less than the auxiliary signal pulse repetition rate T5 so it inhibits the interpretation of noise bursts as valid auxiliary signals unless the noise occurs during the time an auxiliary signal is anticipated Flip-flop 418 activates switch 512 and the voltage appearing on capacitor 513 follows the ramp signal of ramp generator 510 as it rises. Flip-flop 418 is reset by the occurrence of an auxiliary signal pulse pair center as described above for gate 409. This turns off switch 512 storing the received sample voltage on capacitor 513 and this voltage is transferred to capacitor 517 through switch 515 when multivibrator 422 times out. The amplifier comprised of transistors 516 and 518 capacitor 517 and resistor 519 converts the sampled voltage to an audio signal driving the speaker associated with the EKT set.

OUTGOING AUXILIARY SIGNALS

Occurrence of the signal pulse pair center described previously sets flip-flop 420 by way of gate 417 and triggers single trip multivibrator 415 thereby initiating an outgoing pulse pair operation. Multivibrator 422 closes switch 522 to connect the auxiliary audio signal to the PWM comparator while opening switch 521. Thus, PWM comparator 520 now operates with the analog voltage from the EKT station set auxiliary signal microphone (not shown) being compared with the output of ramp generator 510 instead of dc threshold voltage VH being used. As discussed above, ramp generator 510 produces a linearly increasing ramp signal and PWM comparator 520 will be activated when this ramp signal reaches the level as set by the auxiliary signal input. The output of PWM comparator 520 operates duration flip-flop 420 thereby generating an outgoing PWM pulse pair by activating transistors 508, 509 as discussed above for the case of the first half of the pulse pair being negative. Audio window single trip multivibrator 422 remains set until a reset pulse from gate 501 is received by way of lead 340 due to the appearance of the guard pulse of a data word. Resetting single trip multivibrator opens switch 522 thus disconnecting the audio input from comparator 520 and closes switch 521 to connect VH to the comparator input as previously described.

When a specific embodiment of the invention has been disclosed, variations in procedural and structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

I claim:

1. A signal multiplexing circuit for use between a central communication system and a remote communication circuit for concurrently transmitting outgoing voice signals, outgoing data, and outgoing auxiliary signals from said remote communication circuit to said central communication system via a communication path which comprises a single pair of wires, wherein said signal multiplexing circuit comprises:

encoding means for converting said outgoing auxiliary signals into pulse coded signals;

isolation means for separating said outgoing voice signals, said outgoing data and said outgoing encoded auxiliary signals from each other in both frequency and time, and transmitting means for transmitting said separated signals to said central communication system via said single pair of wires.

2. The invention of claim 1 wherein said signal multiplexing circuit additionally comprises:

receiving means for receiving incoming voice signals, incoming data, and incoming encoded auxiliary signals, formatted identically to said outgoing voice signals, said outgoing data, said outgoing encoded auxiliary signals, and transmitted to said remote communication circuit via said single pair of wires;

separation means for separating said incoming voice signals from said incoming data and said incoming encoded auxiliary signals and applying said incoming voice signals to said remote communication circuit;

steering means for isolating said incoming data from said incoming encoded auxiliary signals and applying said incoming data to said remote communication circuit; and decoding means for translating said incoming encoded auxiliary signals into analog signals and applying said analog signals to said remote communication circuit.

3. The invention of claim 2 wherein said separation means comprises a low pass filter.

4. The invention of claim 2 wherein said isolation means includes:

frequency division means for separating said voice signals from both said data and said encoded auxiliary signals in frequency; and time division means for separating said data from said encoded auxiliary signals in time.

5. The invention of claim 4 wherein said encoding means includes pulse width modulation means for transforming said auxiliary signals into pulse width modulation signals.

6. The invention of claim 5 wherein said decoding means comprises pulse width demodulation means for transforming said incoming encoded auxiliary signals into analog signals.

7. The invention of claim 4 wherein said transmitting means includes pulse code modulation means for transmitting said data as pulse code modulation bipolar pulse pairs.

8. The invention of claim 7 wherein said receiving means includes pulse code demodulation means for receiving said incoming data pulse code modulation bipolar pulse pairs.

9. The invention of claim 4 wherein said transmitting means begins transmitting said data while said receiving means is receiving said incoming data.

10. The invention of claim 4 wherein said transmitting means begins transmitting said outgoing encoded auxiliary signals while said receiving means is receiving said incoming encoded auxiliary signals.

11. A signal multiplexing circuit for concurrently transmitting outgoing voice signals, outgoing data, and outgoing auxiliary signals on a communication path comprising a single pair of wires, wherein said signal multiplexing circuit comprises:

encoding means for converting said outgoing auxiliary signals into bipolar pulse pair signals;

formatting means for converting said outgoing data to bipolar pulse pair digital signals;

isolation means for separating said outgoing voice signals from both said formatted outgoing data and said outgoing encoded auxiliary signals in frequency;

time division means for separating said formatted outgoing data from said outgoing encoded auxiliary signals in time; and transmitting means for transmitting said separated outgoing voice signals, formatted outgoing data and outgoing encoded auxiliary signals on said single pair of wires.

12. The invention of claim 11 wherein said signal multiplexing circuit includes reception means for concurrently receiving incoming voice signals, incoming formatted data and incoming encoded auxiliary signals, formatted identically to said outgoing voice signals, to said formatted outgoing data, to said outgoing encoded auxiliary signals respectively, from said single pair of wires wherein said reception means includes:

separation means for separating said incoming voice signals from both said incoming formatted data and said incoming encoded auxiliary signals;

steering means for isolating said incoming formatted data from said incoming encoded auxiliary signals;

decoding means for translating said incoming encoded auxiliary signals into analog auxiliary signals; and reformatting means for translating said incoming formatted data comprising bipolar pulse pair digital signals to binary digital data.

13. The invention of claim 12 wherein said transmitting means transmits said formatted data beginning at the center pair transition of said incoming formatted data and wherein said transmitting means transmits said encoded auxiliary signals beginning at the center pair transition of said incoming encoded auxiliary signals.

14. The invention of claim 13 wherein said outgoing encoded auxiliary signals and said incoming encoded auxiliary signals comprise pulse width modulation bipolar pulse pair signals; and wherein said incoming formatted data and said outgoing formatted data comprise pulse code modulation bipolar pulse pair digital signals.

15. A signal multiplexing system for use between a central communication system and a remote communication circuit for concurrently transmitting outgoing voice signals, outgoing data, and outgoing auxiliary signals bidirectionally between said remote communication circuit and said central communication system via a communication path which comprises a single pair of wires wherein said signal multiplexing system comprises an interface circuit for connecting said remote communication circuit to said single pair of wires and for connecting said central communication system to said single pair of wires, wherein said interface circuit comprises:

encoding means for converting said outgoing auxiliary signals into pulse coded signals;

isolation means for separating said outgoing voice signals, said outgoing data and said outgoing encoded auxiliary signals from each other in both frequency and time, and transmitting means for concurrently transmitting said separated signals on said single pair of wires.

16. The invention of claim 15 wherein said interface circuit additionally comprises:

receiving means for concurrently receiving incoming voice signals, incoming data and incoming encoded auxiliary signals;

separation means for separating said incoming voice signals from both said incoming data and said incoming encoded auxiliary signals;

steering means for isolating said incoming data from said incoming encoded auxiliary signals; and decoding means for translating said incoming encoded auxiliary signals into analog signals.

*17. A signal multiplexing circuit for concurrently transmitting a plurality of signals on a communication path comprising:*

*isolation means responsive to said plurality of signals for separating a first subset of said plurality of signals from the remainder of said plurality of signals in frequency and a second subset of said plurality of signals from the remainder of said plurality of signals in time;*

*transmitting means responsive to said isolation means for concurrently transmitting two or more of said signals at a time on to said communication path.*

*18. The invention of claim 17 wherein said signal multiplexing circuit includes:*

*means for receiving a plurality of incoming signals separated from each other in frequency and time and concurrently transmitted to said signal multiplexing circuit on said communication path.*

*19. The invention of claim 18 wherein said signal multiplexing circuit includes:*

*means for separating said plurality of incoming signals from each other.*

*20. The invention of claim 19 wherein said signal multiplexing circuit includes:*

*encoding means responsive to said plurality of signals for encoding one or more of said plurality of signals; and* wherein said isolation means is responsive to said encoded signals for separating each of said encoded signals from every other one of both said encoded signals and said plurality of signals.

*21. The invention of claim 20 wherein said signal multiplexing circuit includes:*

*means responsive to said incoming signals for decoding the encoded ones of said incoming signals.*

*22. A method of multiplexing a plurality of signals on a communication pair comprising the steps of:*

*separating a first subset of said plurality of signals from the remainder of said plurality of signals in frequency and a second subset of said plurality of signals from the remainder of said plurality of signals in time; and*

*combining all of said separated signals into a single data stream.*

*23. The invention of claim 22 wherein said method of multiplexing a plurality of signals on a communication pair includes the step of:*

*transmitting said single data stream on to said communication pair.*

*24. The invention of claim 23 wherein said step of separating includes the step of:*

*encoding the ones of said plurality of signals which are inappropriately formatted for separation from every other one of said plurality of signals.*

*25. The invention of claim 24 wherein said step of encoding includes the step of:*

*converting analog signals to digital signals.*

*26. A signal multiplexing circuit for concurrently transmitting a plurality of signals on a communication path comprising:*

*frequency division means responsive to said plurality of signals for separating a first subset of said plurality of signals from the remainder of said plurality of signals in frequency;*

*time division means responsive to said plurality of signals for separating each of said signals in said first subset from every other one of said signals in said subset in time and for separating each one of said remainder signals from every other one of said remainder signals in time; and*

*means responsive to said frequency division means and to said time division means for concurrently transmitting said plurality of frequency and time separated signals on to said communication path.*

*27. A signal multiplexing circuit for concurrently transmitting a plurality of signals on a communication path comprising:*

*frequency division means responsive to said plurality of signals for separating a first subset of said plurality of signals from the remainder of said plurality of signals in frequency;*

*time division means responsive to said plurality of signals for separating each of said remainder signals from every other one of said remainder signals in time;*

*means responsive to said frequency division means and to said time division means for concurrently transmitting said plurality of frequency and time separated signals on to said communication path.*

*28. The invention of claim 26 or 27 wherein said signal multiplexing circuit includes:*

*encoding means responsive to said plurality of signals for encoding one or more of said plurality of signals into digital form.*

* * * * *